United States Patent [19]

Mestha et al.

[11] Patent Number: 6,021,285
[45] Date of Patent: Feb. 1, 2000

[54] SENSORLESS QUALITY CONTROL APPARATUS USED UPON MALFUNCTION OF A QUALITY CONTROL SENSOR AND METHOD THEREFOR

[75] Inventors: Lingappa K. Mestha, Fairport; Sohail A. Dianat, Pittsford; Yao Rong Wang, Webster, all of N.Y.; Perry Y. Li, Minneapolis, Minn.; Michael J. Rice, Webster, N.Y.

[73] Assignee: Xerox Corporation, Stamford, Conn.

[21] Appl. No.: 09/083,141

[22] Filed: May 22, 1998

[51] Int. Cl.⁷ .................. G06G 15/00; G06G 15/043; G06G 15/08
[52] U.S. Cl. .................. 399/9; 399/50; 399/51; 399/53
[58] Field of Search .................. 399/9, 48, 31, 399/49, 50, 51, 53, 19

[56] References Cited

U.S. PATENT DOCUMENTS

| | | |
|---|---|---|
| 5,089,848 | 2/1992 | Kusuda et al. .................. 399/31 |
| 5,446,523 | 8/1995 | Shimomura et al. .................. 399/9 X |
| 5,552,860 | 9/1996 | Yamashita et al. .................. 399/19 |
| 5,708,916 | 1/1998 | Mestha .................. 399/49 |

*Primary Examiner*—Susan S. Y. Lee
*Attorney, Agent, or Firm*—Oliff & Berridge, PLC

[57] ABSTRACT

An image quality control apparatus controls quality of xerographic images formed by a xerographic imaging system onto a recording medium when at least one sensor which is operative to provide signals to the xerographic imaging system for quality control malfunctions. The image quality control apparatus includes a controller device in communication with the xerographic imaging system. The controller includes a data collection device, a determining device and an input generating device. The data collection device collects and processes sensor data received from the at least one sensor while the at least one sensor is operative. The determining device determines whether the at least one sensor malfunctions. The input generating device generates a controller input signal by using the sensor data collected by the data collection device and provides the controller input signal to the xerographic imaging system to control quality of the xerographic images when the determining device determines that the at least one sensor has malfunctioned. A method for controlling quality of a xerographic print after malfunction of a quality control sensor is also described.

12 Claims, 3 Drawing Sheets

SENSORLESS QUALITY CONTROL APPARATUS USED UPON MALFUNCTION OF A QUALITY CONTROL SENSOR AND METHOD THEREFOR

BACKGROUND OF THE INVENTION

1. Field of Invention

The invention is directed to a quality control apparatus for a xerographic imaging system. More particularly, the invention relates to a sensorless quality control apparatus that is used to provide quality control signals to the xerographic imaging system when a quality control sensor malfunctions.

2. Description of Related Art

The basic xerographic process used in an electrostatographic printing machine generally involves an initial step of charging a photoconductive member to a substantially uniform potential. The charged surface of the photoconductive member is thereafter exposed to a light image of an original document to selectively dissipate the charge thereon in selected areas irradiated by the light image. This procedure records an electrostatic latent image on the photoconductive member corresponding to the informational areas contained within the original document being reproduced. The latent image is then developed by bringing a developer material including toner particles adhering triboelectrically to carrier granules into contact with the latent image. The toner particles are attracted away from the carrier granules to the latent image, forming a toner image on the photoconductive member which is subsequently transferred to a copy sheet. The copy sheet having the toner image thereon is then advanced to a fusing station for permanently affixing the toner image to the copy sheet in image configuration.

In electrostatographic printing machines using a drum-type or an endless belt-type photoconductive member, the photosensitive surface thereof, can contain more than one image at one time as it moves through various processing stations. The portions of the photosensitive surface containing the projected images, so-called "image areas" are usually separated by a segment of the photosensitive surface called the "inter-document space". After charging the photosensitive surface to a suitable charge level, the inter-document space segment of the photosensitive surface is generally discharged by a suitable lamp to avoid attracting toner particles at the development stations. Various areas on the photosensitive surface, therefore, will be charged to different voltage levels. For example, there will be the high voltage level of the initial charge on the photosensitive surface, a selectively discharged image area of the photosensitive surface and a fully discharged portion of the photosensitive surface between the image areas.

The approach utilized for multicolor electrostatographic printing is substantially identical to the process described above. However, rather than forming a single latent image on the photosensitive surface in order to reproduce an original document, as in the case of black and white printing, multiple latent images corresponding to color separations are sequentially recorded on the photosensitive surface. Each single color electrostatic latent image is developed with toner of a color complementary thereto and the process is repeated for differently colored images with respective toner of complementary color. Thereafter, each single color toner image can be transferred to the copy sheet in superimposed registration with the prior toner image, creating a multi-layered toner image on the copy sheet. Finally, this multi-layered toner image is permanently affixed to the copy sheet in a conventional manner to form a finished color copy.

As described, the surface of the photoconductive member must be charged by a suitable device prior to exposing the photoconductive member to a light image. This operation is typically performed by a corona charging device. One type of a corona charging device comprises a current carrying electrode enclosed by a shield on three sides and a wire grid or control screen positioned thereover and spaced apart from the open side of the shield. Biasing potentials are applied to both the electrode and the wire grid to create electrostatic fields between the charged electrode and the shield, between the charged electrode and the wire grid, and between the charged electrode and the (grounded) photoconductive member. These fields repel electrons from the electrode and the shield resulting in an electrical charge at the surface of the photoconductive member roughly equivalent to the grid voltage. The wire grid is located between the electrode and the photoconductive member for controlling the charge strength and charge uniformity on the photoconductive member as caused by the aforementioned fields.

Control of the field strength and uniformity of the charge on the photoconductive member is very important because consistently high quality reproductions are best produced when a uniform charge having a predetermined magnitude is obtained on the photoconductive member. If the photoconductive member is not charged to a sufficient level, the electrostatic latent image obtained upon exposure will be relatively weak and the resulting deposition of development material will be correspondingly decreased. As a result, the copy produced by an undercharged photoconductor will be faded. If, however, the photoconductive member is overcharged, too much developer material will be deposited on the photoconductive member. The copy produced by an overcharged photoconductor will have a gray or dark background instead of the white background of the copy paper. In addition, areas intended to be gray will be black and tone reproduction will be poor. Moreover, if the photoconductive member is excessively overcharged, the photoconductive member can become permanently damaged.

A useful tool for measuring voltage levels on the photosensitive surface is an electrostatic voltmeter (ESV) or electrometer. The electrometer is generally rigidly secured to the reproduction machine adjacent the moving photosensitive surface and measures the voltage level of the photosensitive surface as it traverses an ESV probe. The surface voltage is a measure of the density of the charge on the photoreceptor, i.e. the photoconductive member, which is related to the quality of the print output. In order to achieve high quality printing, the surface potential on the photoreceptor at the developing zone should be within a precise range.

In a typical xerographic charging system, the amount of voltage obtained at the point of electrostatic voltage measurement of the photoconductive member, namely, at the ESV, is less than the amount of voltage applied at the wire grid of the point of charge application. In addition, the amount of voltage applied to the wire grid of the corona generator required to obtain a desired constant voltage on the photoconductive member must be increased or decreased according to various factors which affect the photoconductive member. Such factors include the rest time of the photoconductive member between printing, the voltage applied to the corona generator for the previous printing job, the copy length of the previous printing job, machine to machine variance, the age of the photoconductive member and changes in the environment.

One way of monitoring and controlling the surface potential in the development zone is to locate a voltmeter directly in the developing zone and then to alter the charging conditions until the desired surface potential is achieved in the development zone. However, the accuracy of voltmeter measurements can be affected by the developing materials (such as toner particles) such that the accuracy of the measurement of the surface potential is decreased. In addition, in color printing there can be a plurality of developing areas within the developing zone corresponding to each color to be applied to a corresponding latent image. Because it is desirable to know the surface potential on the photoreceptor at each of the color developing areas in the developing zone, it would be necessary to locate a voltmeter at each color area within the developing zone. Cost and space limitations make such an arrangement undesirable.

In a typical charge control system, the point of charge application and the point of charge measurement is different. The zone between these two devices loses the immediate benefit of charge control decisions based on measured voltage error since this zone is downstream from the charging device. This zone may be as great as a belt revolution or more due to charge averaging schemes. This problem is especially evident in aged photoreceptors because their cycle-to-cycle charging characteristics are more difficult to predict. Charge control delays can result in improper charging, poor copy quality and often leads to early photoreceptor replacement. Thus, there is a need to anticipate the behavior of a subsequent copy cycle and to compensate for predicted behavior beforehand.

Various systems have been designed and implemented for controlling processes within a printing machine. For example, U.S. Pat. No. 5,243,383 discloses a charge control system that measures first and second surface voltage potentials to determine a dark decay rate model representative of voltage decay with respect to time. The dark decay rate model is used to determine the voltage at any point on the imaging surface corresponding to a given charge voltage. This information provides a predictive model to determine the charge voltage required to produce a target surface voltage potential at a selected point on the imaging surface.

U.S. Pat. No. 5,243,383 discloses a charge control system that uses three parameters to determine a substrate charging voltage, a development station bias voltage and a laser power for discharging the substrate. The parameters are various difference and ratio voltages.

The electrostatic voltmeter 33 senses and measures the voltage on the photoreceptor belt 20 while an optical sensor device 84 measures toner mass. These measurements are used in process control loops to maintain control of the electrostatics and the development systems for the xerographic process. However, process control loops are prone to malfunction due to numerous factors such as sensor malfunction and actuator saturation. When a malfunction occurs, feedback signals from the electrostatic voltmeter 33 and the optical sensor device 84 are no longer provided and therefore the quality of the xerographic prints becomes unacceptable.

One method of avoiding this problem is to provide a backup electrostatic voltmeter and a backup optical sensor device. However, this method adds additional cost to a xerographic imaging system.

It would be advantageous if a computer-implemented sensorless controller can be used to provide the appropriate feedback signals upon malfunction of any one of the quality control sensors such as the electrostatic voltmeter and the optical sensor device.

SUMMARY OF THE INVENTION

An image quality control apparatus of the invention controls quality of xerographic images formed by a xerographic imaging system when at least one sensor operative to provide input signals to the xerographic imaging system for quality control malfunctions. The image quality control apparatus of the invention includes a controller device in communication with the xerographic imaging system. The controller device has a data collection device, a determining device and an input generating device. The data collection device collects and processes sensor data received from the at least one sensor while the at least one sensor is operative. The determining device determines whether the at least one sensor malfunctions. The input generating device generates a controller input signal by using the sensor data collected by the data collection device and provides the controller input signal to the xerographic imaging device to control quality of the xerographic images when the determining device determines that the at least one sensor has malfunctioned.

A method for controlling quality of a xerographic print includes the steps of collecting sensor data from the at least one sensor while the at least one sensor is operating, determining whether the at least one sensor malfunctions and, upon determining that the at least one sensor malfunctioned, generating a controller input signal based upon the collected sensor data and providing the controller input signal to a xerographic system to control quality of the xerographic print.

BRIEF DESCRIPTION OF THE DRAWINGS

Other features of the invention will become apparent as the following description proceeds and upon reference to the drawings, in which.

DETAILED DESCRIPTION OF PREFERRED EMBODIMENTS

Figure 1:
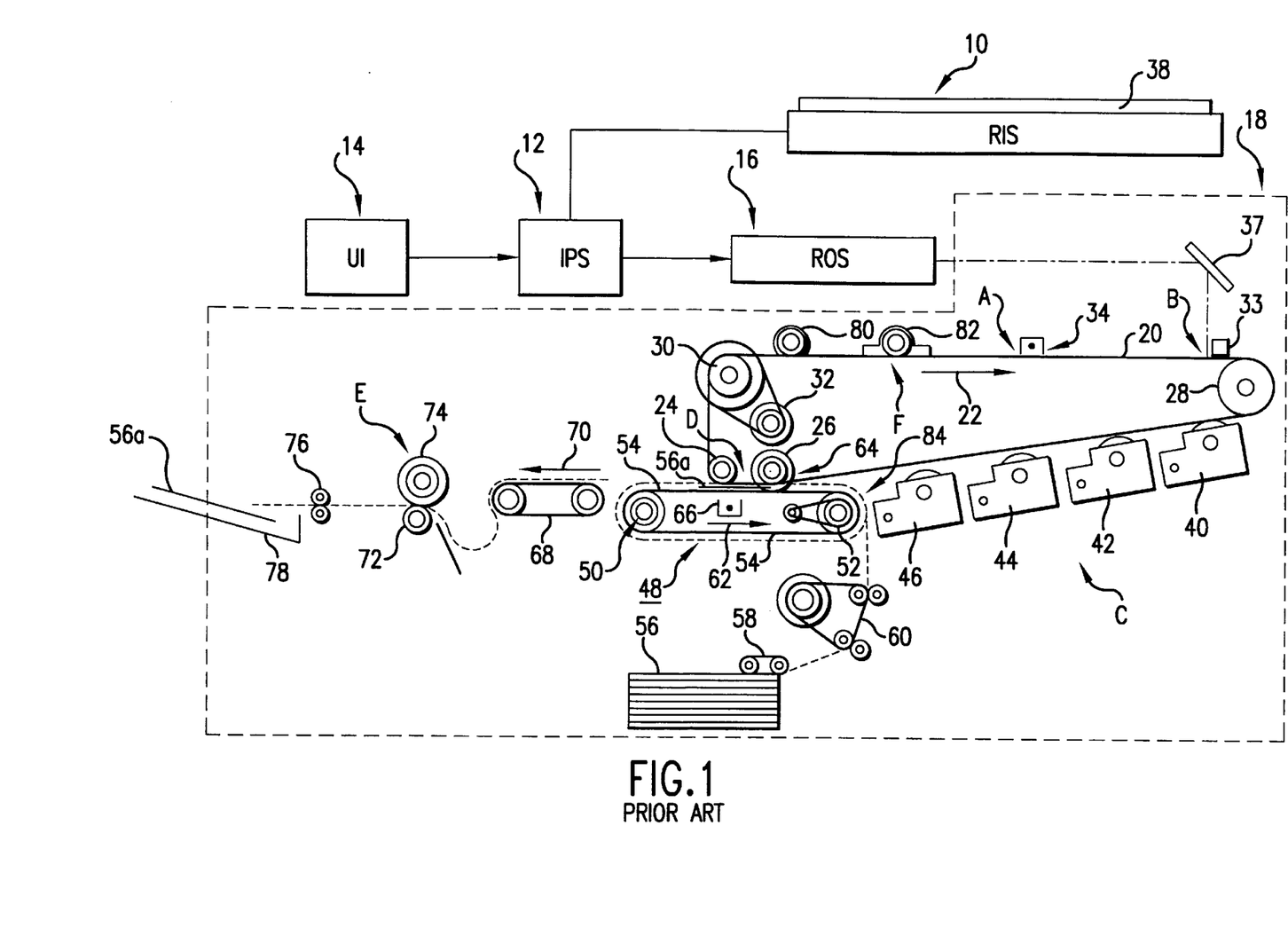
FIG. 1 is a schematic diagram of a conventional multicolor xerographic imaging system.

For a general understanding of the features of the invention, reference is made to the drawings wherein like references have been used throughout to designate identical elements. A schematic elevational view showing a conventional electrophotographic printing machine capable of performing a xerographic printing process is shown in FIG. 1. It would become evident from the following discussion that the invention is equally well-suited for use in a wide variety of printing systems including ionographic printing machines and discharge area development systems, as well as other more general non-printing systems providing multiple or variable outputs such that the invention is not necessarily limited in its application to the particular system shown herein.

With reference to FIG. 1, before describing the particular features of the invention in detail, a conventional electrophotographic printing machine will be described. The electrophotographic printing machine may be a multicolor copier, as for example, the recently introduced Xerox Corporation "5775" copier. To initiate the copying or xerographic process, a multicolor original document 38 is positioned on a raster input scanner RIS 10. The RIS 10 contains document illumination lamps, optics, a mechanical scanning drive, and a charge coupled device (CCD array) for capturing the entire image from the original document 38. The RIS 10 converts the image to a series of raster scan lines and measures a set of primary color densities, i.e. red, green and blue densities, at each point of the original document. This information is transmitted as an electrical signal to an image processing system IPS 12 which converts the set of red, green and blue density signals to a set of colorimetric coordinates. The IPS 12 contains control electronics for preparing and managing the image data flow to a raster output scanner ROS 16.

A user interface UI 14 is provided for communicating with the IPS 12. The UI 14 enables an operator to control the various operator adjustable functions whereby the operator actuates the appropriate input keys of the UI 14 to adjust the parameters of the copy. The UI 14 may be a touch screen, or any other suitable device for providing an operator interface with the xerographic system. The output signal from the UI 14 is transmitted to the IPS 12 which then transmits signals corresponding to the desired image to the ROS 16.

The ROS 16 includes a laser with rotating a multi-facet polygon mirror or mirror blocks 37 which is a component of an exposure station B discussed below. The ROS 16 eliminates, via the mirror 37, a charged portion of a photoreceptor belt 20 of a printer or marking engine 18. The mirror 37 is used to illuminate the photoreceptor belt 20 at a rate of about 400 pixels per inch. The ROS 16 exposes the photoreceptor belt 20 to record a set of three subtractive primary latent images thereon corresponding to the signals transmitted from the IPS 12. One latent image is to be developed with cyan developer material, another latent image is to be developed with magenta developer material and the third latent image is to be developed with yellow developer material. These developed images are subsequently transferred to a copy sheet 56a (or other suitable recording medium) in superimposed registration with one another to form a multicolored image on the copy sheet which is then fused thereto to form a color copy. This process is discussed in greater detail below.

With continued reference to FIG. 1, the printer or marking engine 18 is an electrophotographic printing machine comprising the photoreceptor belt 20 which is entrained about transfer rollers 24 and 26, a tensioning roller 28 and a drive roller 30. The drive roller 30 is rotated by a motor or other suitable mechanism coupled to the drive roller 30 by suitable means such as a belt drive 32 as the drive roller 30 rotates, it advances the photoreceptor belt 20 in a direction of arrow 22 to sequentially advance successive portions of the photoreceptor belt 20 through various processing stations disposed about the path of movement thereof.

The photoreceptor belt 20 is preferably made from a polychromatic photoconductive material comprising an anti-curl layer, a supporting substrate layer and an electrophotographic imaging single layer or multi-layers. The imaging layer may contained homogeneous, heterogeneous, inorganic or organic compositions. Preferably, finely divided particles of a photoconductive inorganic compound are dispersed in an electrically insulating organic resin binder. Typical photoconductive particles include metal-free phthalocyanine, such as copper phthalocyanine, quinacridones 2,4-diaminotriazines and polynuclear aromatic quinines. Typical organic resinous binders include polycarbonates, acrylate polymers, vinyl polymers, cellulose polymers, polyesters, polysiloxanes, polyamides, polyurethanes, epoxies and the like.

Initially, a portion of the photoreceptor belt 20 passes through an electrostatic charging station A. At the electrostatic charging station A, a corona generating device 34 or other charging device generates a charge of voltage to charge the photoreceptor belt 20 to a relatively high, substantially uniform voltage potential. The corona generator device 34 comprises a corona generating electrode, a shield partially enclosing the electrode, and a grid that dispose between the photoreceptor belt 20 and an unenclosed portion of the electrode. The electrode charges the photoconductive surface of the photoreceptor belt 20 via corona discharge. The voltage potential applied to the photoconductive surface of the photoreceptor belt 20 is varied by controlling the voltage potential of the wire grid.

Next, the charged photoconductive surface is rotated to the exposure station B. The exposure station B receives a modulated light beam corresponding to information derived by the RIS 10 having the multicolored original document 38 positioned thereon. The modulated light beam impinges on the surface of the photoreceptor belt 20, selectively illuminating the charged surface of the photoreceptor belt 20 to form an electrostatic latent image thereon. The photoconductive belt 20 is exposed three times to record three latent images representing each color.

After the electrostatic latent images have been recorded on the photoreceptor belt 20, the photoreceptor belt 20 is advanced towards a development station C. However, before reaching the development station C, the photoreceptor belt 20 passes subjacent to a voltage monitor, preferably an electrostatic voltmeter 33, for measurement of the voltage potential at the surface of the photoreceptor belt 20. The electrostatic voltmeter 33 can be any suitable type known in the art wherein the charge on the photoconductive surface of the photoreceptor belt 20 is sensed such as disclosed in U.S. Pat. Nos. 3,870,968; 4,205,257; or 4,853,639, the contents of which are incorporated by reference herein.

A typical electrostatic voltmeter is controlled by a switching arrangement which provides a measuring condition in which charge is induced on a probe electrode corresponding to the sensed voltage level of the photoreceptor belt 20. The induced charge is proportional to the sum of the internal capacitance of the probe and its associated circuitry, relative to the probe-to-measured surface capacitance. A DC measurement circuit is combined with the electrostatic voltmeter circuit for providing an output which can be read by a conventional test meter or input to a control circuit, as for example, the control circuit of the invention. The voltage potential measurement of the photoreceptor belt 20 is utilized to determine specific parameters for maintaining a predetermined potential on the photoreceptor surface, as will be understood with reference to the specific subject matter of the invention, explained in detail below.

The development station C includes four individual developer units indicated by reference numerals 40, 42, 44 and 46. The developer units 40, 42, 44 and 46 are of a type generally referred to in the art as "magnetic brush development units". Typically, a magnetic brush development system employs a magnetizable developer material including magnetic carrier granules having toner particles adhering triboelectrically thereto. The developer material is continually brought through a directional flux field to form a brush of developer material. The developer material is constantly moving so as to continually provide the brush with fresh developer material. Development is achieved by bringing the brush of development material into contact with the photoconductive surface.

The developer units 40, 42 and 44, respectively, apply toner particles of a specific color corresponding to the complement of the specific color separated electrostatic latent image recorded on the photoconductive surface. Each of the toner particles is adapted to absorb light within a preselected spectral region of the electromagnetic wave spectrum. For example, an electrostatic latent image formed by discharging the portions of charge on the photoreceptor belt 20 corresponding to the green regions of the original document will record the red and blue portions as areas of relatively high charge density on the photoreceptor belt 20, while the green areas will be reduced to a voltage level ineffective for development. The charged areas are then made visible by having the developer unit 40 apply green absorbing (magenta) toner particles onto the electrostatic latent image recorded on the photoreceptor belt 20. Similarly, a blue separation is developed by developer unit 42 with blue absorbing (yellow) toner particles while the red separation is developed by the developer unit 44 with red absorbing (cyan) toner particles. The developer unit 46 contains black toner particles and may be used to develop the electrostatic image formed from a black and white original document.

In FIG. 1, the developer unit 40 is shown in the operative position with the developer units 42, 44 and 46 being in the non-operative position. During development of each electrostatic latent image, only one developer unit is in the operative position, while the remaining developer units are in the non-operative position. Each of the developer units is moved into and out of an operative position. In the operative position, the magnetic brush is positioned substantially adjacent the photoreceptor belt 20, while in the non-operative position, the magnetic brush is spaced therefrom. Thus, each electrostatic latent image or panel is developed with toner particles of the appropriate color without commingling.

After development, the toner image is moved to a transfer station D. The transfer station D includes a transfer zone 64 defining the position at which the toner image is transferred to the copy sheet 56a, which may be a sheet of plain paper or any other suitable support substrate. A sheet transport apparatus 48 moves the sheet into contact with the photoreceptor belt 20. The sheet transport apparatus 48 has a belt 54 entrained about a pair of substantially cylindrical rollers 50 and 52. A friction retard feeder 58 advances the uppermost sheet from a stack 56 onto a pre-transfer transport 60 for advancing the copy sheet to the sheet transport apparatus 48 in synchronism with the movement thereof so that a leading edge of the copy sheet arrives at a preselected position, i.e. a loading zone. The copy sheet is received by the sheet transport apparatus 48 for movement therewith in a recirculating path. As belt 54 of the sheet transport apparatus 48 moves in a direction of arrow 62, the sheet is moved into contact with the photoreceptor belt 20, in synchronism with the toner image developed thereon.

In a transfer zone 64, a corona generating device 66 sprays ions onto a backside of the copy sheet so as to charge the copy sheet to the proper magnitude and polarity for attracting the toner image from the photoreceptor belt 20 thereto. The copy sheet remains secured to a sheet gripper so as to move in a recirculating path for three cycles. In this manner, three different color toner images are transferred to the copy sheet in superimposed registration with one another. Each of the electrostatic latent images recorded on the photoconductive surface is developed with the appropriately colored toner and transferred, in superimposed registration with one another to the copy sheet for forming the multi-color copy of the colored original document. One skilled in the art will appreciate that the copy sheet may move in a recirculating path for four cycles when undercolor black removal is used.

After the last transfer operation, the sheet transport apparatus 48 directs the copy sheet to a vacuum conveyor 68. The vacuum conveyor 68 transports the copy sheet in a direction of arrow 70 to a fusing station E where the transferred toner image is permanently fused to the sheet. The fusing station E includes a heated fuser roller 74 and a pressure roller 72. The sheet passes through a nip defined by the fuser roller 74 and the pressure roller 72. The toner image contacts the fuser roller 74 so as to be fixed to the copy sheet. Thereafter, the copy sheet is advanced by a pair of rolls 76 to a catch tray 78 for subsequent removal therefrom by the machine operator.

The last processing station in the direction of movement of the photoreceptor belt 20, as indicated by the arrow 22, is a cleaning station F. A lamp 80 illuminates the surface of the photoreceptor belt 20 to remove any residual charge remaining thereon. Thereafter, a rotatably mounted fibrous brush 82 is positioned in the cleaning station F and maintained in contact with the photoreceptor belt 20 to remove any residual toner particles remaining from the transfer operation prior to the start of the next successive imaging cycle.

Figure 2:
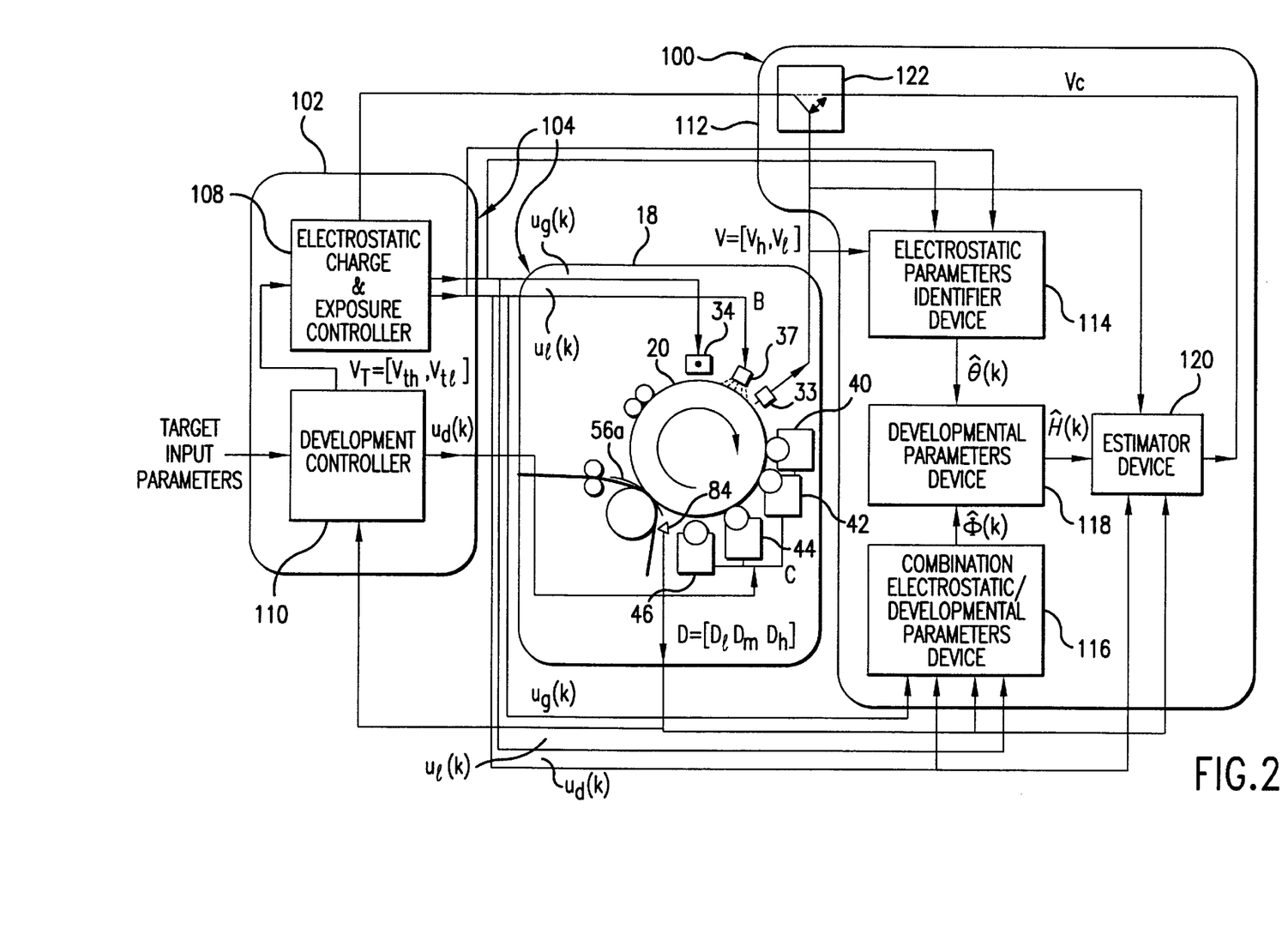
FIG. 2 is a schematic diagram of an image quality control apparatus of the invention connected to the xerographic imaging system of FIG. 1.

An image quality control apparatus 100 of the invention is generally introduced in FIG. 2. The image quality control apparatus 100 of the invention is operably connected to the printer or marking engine 18 and an input controller 102. One of ordinary skill in the art would appreciate that the printer or marking engine 18 is a simplified version of the printer 18 shown in FIG. 1 for ease of explanation only. The significant components are labeled with like reference numerals.

The input controller 102 receives input parameters from a selected source such as the operator or from a look-up table of target input parameter values that are provided by the manufacturer. The input controller 102 and the printer 18 form a xerographic imaging system 104 capable of generating xerographic images on a recording medium such as the copy sheet 56a.

The input controller 102 includes an electrostatic charge and exposure controller 108 and a development controller 110. The development controller 110 receives target input parameters and, after printing the initial xerographic image, receives developmental sensor parameters D. The target input parameters are typically stored in a target lookup table (not shown) or are input by the machine operator using an interface device. A skilled artisan would appreciate that the developmental sensor parameters D represent three developmental sensor parameters of each one of a low density print control patch $D_l$, a medium density print control patch $D_m$ and a high density print control patch $D_h$, found on an inter-document space of the photoreceptor belt 20. The developmental controller 110 provides a developmental actuator voltage $u_d(k)$ to the development station C for each of the developer units 40, 42, 44 and 46 wherein k represents the print number of the copy sheet. Thus, k+1 would represent the next copy sheet to be printed while k−1 would represent the copy sheet previously printed. The development controller 110 also provides a target voltage $V_T$ to the electrostatic charge and exposure controller 108. A skilled artisan would appreciate that the target voltage $V_T$ represents a high target voltage $V_{Th}$ as well as a low target voltage $V_{Tl}$.

The electrostatic charge and exposure controller 108 receives the target voltage $V_T$ and, after the initial printing of the xerographic image onto the recording medium or copy sheet 56a, receives an electrostatic sensor value V from the electrostatic voltmeter 33. The electrostatic sensor value V represents a high electrostatic sensor value $V_h$ and a low electrostatic sensor value $V_l$. The electrostatic charge and exposure controller 108 provides a grid actuator voltage $u_g(k)$ to the corona generating device 34. Also, the electrostatic charge and exposure controller 108 provides a laser actuator voltage $u_l(k)$ to the exposure station B that includes the mirror 37.

The image quality control apparatus 100 controls quality of the xerographic images that are formed by the xerographic imaging system 104 onto the recording medium 56a when the electrostatic voltmeter 33, acting as an electrostatic sensor, malfunctions to provide the electrostatic sensor voltage V as input signals to the electrostatic charge and exposure controller 108. The image quality control apparatus 100 includes a controller device 112 that is in communication with the xerographic imaging system 104 via the input controller 102 as well as the printer or marking engine 18. The controller device 112 collects and processes sensor data received from the electrostatic voltmeter 33 as well as the optical sensor device 84 as long as the electrostatic voltmeter 33 is operating. The controller device 112 also determines whether the electrostatic voltmeter 33 malfunctions. Additionally, the controller device 112 generates a controller input signal $V_c$ by using the collected sensor data and provides the controller input signal $V_c$ to the input control 102 when the electrostatic voltmeter 33 malfunctions. However, one of ordinary skill in the art would appreciate that the image quality control apparatus 100 of the invention can be adapted to collect and process any sensor data and provide a controller input signal $V_c$ upon malfunction of any sensor associated with controlling quality of xerographic images.

The controller device 112 includes an electrostatic parameters identifier device 114, a combination electrostatic/developmental parameters device 116, a developmental parameters device 118 and an estimator device 120. The electrostatic parameters identifier device 114 identifies electrostatic parameters of the xerographic imaging system 104. Specifically, the electrostatic parameters identifier device 114 estimates the electrostatic parameters when it identifies the electrostatic parameters of the xerographic imaging system.

A mathematical model of the electrostatic system, i.e., the operation of the electrostatic charging station A, is represented as follows:

$$V_h(k+1)-V_{ho}=B_{11}u_g(k) \quad V_l(k+1)-V_{lo}=B_{21}u_g(k)+B_{22}u_l(k) \quad (1)$$

wherein the parameters are defined as follows:

$V_h$ is the voltage on the unexposed photoreceptor;

$V_{ho}$ is nominal voltage on the unexposed photoreceptor;

$B_{xy}$ are the elements of the sensitivity (Jacobian) matrix of the photoreceptor voltage with respect to $U_g$ and $U_l$;

$V_l$ is the voltage on the exposed photoreceptor;

$V_{lo}$ is the nominal voltage on the exposed photoreceptor;

A mathematical model of the electrostatic system above is represented in vector form as follows:

$$\underline{V}(k+1)=\underline{C}^T(k)\underline{\theta}+\underline{N}(k) \quad (2)$$

where, $$\underline{V}(k+1) = \begin{bmatrix} V_h(k+1)-V_{ho} \\ V_l(k+1)-V_{lo} \end{bmatrix}, \underline{\theta} = \begin{bmatrix} B_{11} \\ B_{21} \\ B_{22} \end{bmatrix}, \underline{C}(k) = \begin{bmatrix} u_g(k) & 0 \\ 0 & u_g(k) \\ 0 & u_l(k) \end{bmatrix},$$

and $\underline{N}(k)$ is the noise term due to measurement errors.

$\underline{V}$ is a measurement vector and $\underline{C}$ is a control matrix and $\underline{\theta}$ represents the electrostatic parameters. Subscript T is used to describe the transpose of the matrix.

The electrostatic parameters device 114 operates as follows:

READ: $u_g(k), u_l(k)$ $V_h(k+1)-V_{ho}$, $V_l(k+1)-V_{lo}$

COMPUTE: $\hat{\theta}(k)$ wherein $\hat{\theta}(k) = \begin{bmatrix} \hat{B}_{11}(k) \\ \hat{B}_{21}(k) \\ \hat{B}_{22}(k) \end{bmatrix}$ $\hat{\theta}(k) = \hat{\theta}(k-1) + K(k)[V(k+1) - C^T(k)\hat{\theta}(k-1)]$ $V(k+1) = \begin{bmatrix} V_h(k+1) - C_{ho} \\ V_l(k+1) - C_{lo} \end{bmatrix}$ -continued $$C(k) = \begin{bmatrix} u_g(k) & 0 \\ 0 & u_g(k) \\ 0 & u_l(k) \end{bmatrix}$$

$K(k) = P(k-1)C(k)[C^T(k)P(k-1)C(k) + \lambda I]^{-1}$ $P(k) = \frac{1}{\lambda}[I - K(k)C^T(k)]P(k-1)$ wherein $\hat{\theta}(k)$ represents the estimated electrostatic parameters;

$\lambda$ is the forgetting factor with a value that is between 0 and 1; and

I is the identity matrix.

With reference to FIG. 2, the estimation of $\hat{\theta}$ is made "on line" recursively by using the sensor data which is available sequentially on a print to print basis. In brief, the estimated electrostatic parameters are compared with the actual electrostatic parameters and a difference between them is determined in a summing node (not shown) resulting in an error signal. The error signal is fed to a plurality of estimation algorithms which, in turn, adjust the estimated electrostatic parameters $\hat{\theta}$ so that ideally the error becomes zero.

The combination electrostatic/developmental parameters device 116 uses a combination of the electrostatic control parameters $u_g(k)$, $u_l(k)$, development control parameter $u_d(k)$ and the developmental sensor values $D(k)$ and estimates the combined electrostatic and development system sensitivities. Specifically, the combination electrostatic/developmental parameters device 116 estimates the combination electrostatic/developmental parameters when the combination electrostatic/developmental parameters device 116 identifies the combination thereof. As shown in FIG. 2, the combination electrostatic/developmental parameters device 116 receives the grid actuator voltage $u_g(k)$, the laser actuator voltage $u_l(k)$, the developmental actuator voltage $u_d(k)$ and the developmental sensor parameters D. The combination electrostatic/developmental parameters device 116 processes these inputs to yield a combination electrostatic developmental parameters $\hat{\Phi}(k)$ by using a plurality of applicable algorithms.

Specifically, the combination electrostatic/developmental parameters device 116 operates as follows:

READ: $D_l(k), D_m(k), D_h(k)$, $u_g(k), u_l(k)$,

AND $u_d(k)$

COMPUTE: $\hat{\Phi}(k)$ $\hat{\Phi}(k)=\hat{\Phi}(k-1)+K(k)[D(k+1)-C^T(k)\hat{\Phi}(k-1)]$ $D(k) = \begin{bmatrix} D_h(k) \\ D_m(k) \\ D_l(k) \end{bmatrix}$ $$C^T(k) = \begin{bmatrix} u_g(k) & u_l(k) & u_d(k) & 0 & 0 & 0 & 0 & 0 & 0 \\ 0 & 0 & 0 & u_g(k) & u_l(k) & u_d(k) & 0 & 0 & 0 \\ 0 & 0 & 0 & 0 & 0 & 0 & u_g(k) & u_l(k) & u_d(k) \end{bmatrix}$$

$K(k) = P(k-1)C(k)[C^T(k)P(k-1)C(k) + \lambda I]^{-1}$ $P(k) = \frac{1}{\lambda}[I - K(k)C^T(k)]P(k-1)$ where $\hat{\Phi}(k)$ is the estimated elements of the sensitivity matrix of the combined electrostatic and development system.

The developmental parameters device 118 is in communication with both the electrostatic parameters identifier device 114 and the combination electrostatic/developmental parameters device 116 and extracts developmental parameters Ĥ(k) from the estimated electrostatic parameters θ̂(k) and the estimated combination electrostatic/developmental parameters Φ̂(k).

A skilled artisan would comprehend that the developmental parameters Ĥ(k) is based upon an estimate from the estimated electrostatic parameters θ̂(k) and the estimated combination electrostatic/developmental parameters Φ̂(k).

The developmental parameters device 118 operates as follows:

READ: $\hat{\theta}(k) = [\hat{\theta}_1(k) \; \hat{\theta}_2(k) \; \hat{\theta}_3(k)]^T$ $$\hat{\Phi}(k) = \begin{bmatrix} \hat{\Phi}_{11}(k) & \hat{\Phi}_{12}(k) & \hat{\Phi}_{13}(k) \\ \hat{\Phi}_{21}(k) & \hat{\Phi}_{22}(k) & \hat{\Phi}_{23}(k) \\ \hat{\Phi}_{31}(k) & \hat{\Phi}_{32}(k) & \hat{\Phi}_{33}(k) \end{bmatrix}$$

COMPUTE: Ĥ(k)

$$\hat{H}(k) = \begin{bmatrix} \frac{1}{\hat{\theta}_1(k)} & 0 & 0 \\ -\frac{\hat{\theta}_2(k)}{\hat{\theta}_1(k)\hat{\theta}_3(k)} & \frac{1}{\hat{\theta}_3(k)} & 0 \\ 0 & 0 & 1 \end{bmatrix} \begin{bmatrix} \hat{\Phi}_{11}(k) & \hat{\Phi}_{12}(k) & \hat{\Phi}_{13}(k) \\ \hat{\Phi}_{21}(k) & \hat{\Phi}_{22}(k) & \hat{\Phi}_{23}(k) \\ \hat{\Phi}_{31}(k) & \hat{\Phi}_{32}(k) & \hat{\Phi}_{33}(k) \end{bmatrix}$$

$$\hat{H}(k) = \begin{bmatrix} \hat{H}_{11}(k) & \hat{H}_{12}(k) & \hat{H}_{13}(k) \\ \hat{H}_{21}(k) & \hat{H}_{22}(k) & \hat{H}_{23}(k) \\ \hat{H}_{31}(k) & \hat{H}_{32}(k) & \hat{H}_{33}(k) \end{bmatrix}$$

where Ĥ(k) is the estimated elements of the sensitivity matrix of the development system.

The estimator device 120 receives the developmental parameters Ĥ(k) from the developmental parameters device 118 along with the developmental actuator voltage $u_d(k)$, the laser actuator voltage $u_l(k)$ and the electrostatic sensor voltage V(k). Based on these values, the estimator device 120 estimates the controller input signal $V_c$ which, in turn, is provided to the xerographic imaging system 104, and particularly to the electrostatic charge exposure controller 108, when the electrostatic voltmeter 33 has malfunctioned. A skilled artisan would appreciate that the estimator device 120 stores the controller input signal $V_c$ calculated for successive iterations and uses the stored controller input signal $V_c$ to calculate an updated controller input signal $V_c$.

The estimator device 120 operates as follows:

READ: Ĥ(k), $u_d(k)$, $u_g(k)$, AND D(k)

CALCULATE $V_c$ $$\begin{bmatrix} \hat{V}_h - V_{ho} \\ \hat{V}_l - V_{lo} \end{bmatrix} =$$

$$\left[ \begin{bmatrix} \hat{H}_{11} & \hat{H}_{12} \\ \hat{H}_{21} & \hat{H}_{22} \\ \hat{H}_{31} & \hat{H}_{32} \end{bmatrix}^T \begin{bmatrix} \hat{H}_{11} & \hat{H}_{12} \\ \hat{H}_{21} & \hat{H}_{22} \\ \hat{H}_{31} & \hat{H}_{32} \end{bmatrix} \right]^{-1} \begin{bmatrix} \hat{H}_{11} & \hat{H}_{12} \\ \hat{H}_{21} & \hat{H}_{22} \\ \hat{H}_{31} & \hat{H}_{32} \end{bmatrix}^T \begin{bmatrix} D_h - \hat{H}_{13} u_d \\ D_m - \hat{H}_{23} u_d \\ D_l - \hat{H}_{33} u_d \end{bmatrix}$$

-continued $$V_c = \begin{bmatrix} \hat{V}_h \\ \hat{V}_l \end{bmatrix} = \begin{bmatrix} \hat{V}_h - V_{ho} \\ \hat{V}_l - V_{lo} \end{bmatrix} + \begin{bmatrix} \hat{V}_{ho} \\ \hat{V}_{lo} \end{bmatrix}$$

where $\hat{V}_{ho}$ is the estimated nominal unexposed photoreceptor voltage obtained from the historical trend data and V̂hd lois the estimated exposed photoreceptor voltage obtained from the historical trend data.

The image quality control apparatus 100 also includes a switch device 122 that provides the controller input signal $V_c$ to the xerographic imaging system 104 when it is determined that the electrostatic voltmeter 33 has malfunctioned. The switch device 122 automatically moves from an opened state, as shown by the dashed line in FIG. 2, to a closed state, i.e., the solid line in FIG. 2 moving to the dashed line. The switch device 122 is also capable of determining that the electrostatic voltmeter 33 has malfunctioned. By way of example only, the switch 122 can automatically move from the open state to the closed state when the electrostatic sensor voltage V from the electrostatic voltmeter 33 is no longer detected. Also, other types of electrical, mechanical, electromagnetic, or logic devices can be used in conjunction with the switch device 122 to determine that the electrostatic voltmeter 33 malfunctioned because, for example, the electrostatic sensor voltage V(k) can no longer be detected and, therefore, the electrostatic voltmeter 33 has failed. Also, a skilled artisan would appreciate that the switch device could predict when the electrostatic voltmeter 33 will either malfunction or fail. However, details of such a switch device is beyond the scope of the invention.

Figure 3:
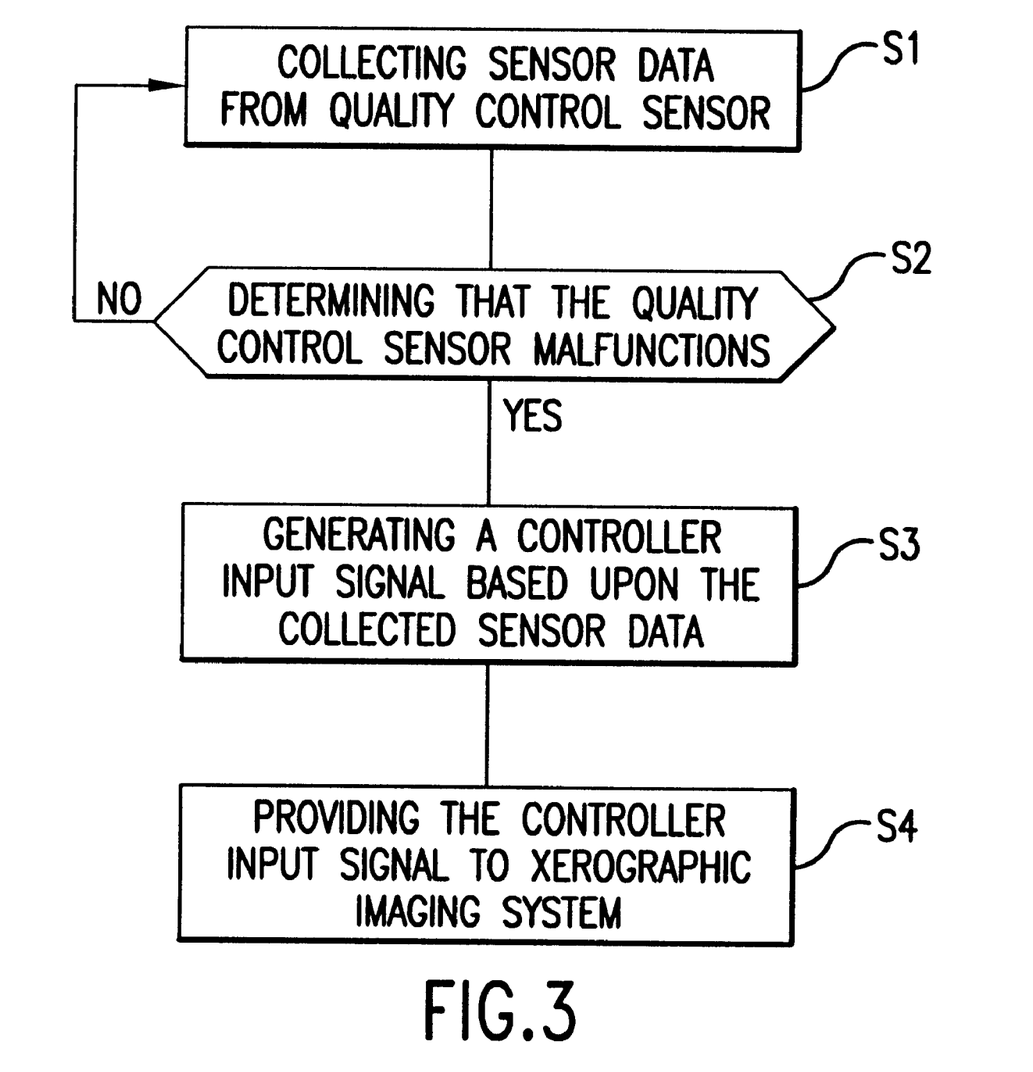
FIG. 3 is a flowchart of steps implementing a method of practicing the image quality control apparatus of the invention.

A method for practicing the image quality control apparatus of the invention is introduced in FIG. 3. The method controls the quality of a xerographic print made on the copy sheet by the xerographic imaging system 104 after malfunction of the electrostatic voltmeter 33 or at least one other quality control sensor that is operably connected to the xerographic imaging system. Step S1 collects sensor data from the at least one sensor while the at least one sensor is operating. Step S2 determines that the quality control sensor has malfunctioned. If the quality control sensor has not malfunctioned, step S1 is repeated for each xerographic print. However, if it is determined that the quality control sensor malfunctioned, step S3 generates a controller input signal that is based upon the collected sensor data. Step S4 provides the controller input signal to the xerographic imaging system.

Further, many xerographic imaging systems include a plurality of quality control sensors. In this case, if at least one quality control sensor malfunctions, the controller input signal is based upon the collected sensor data as well as data from the remaining quality control sensors that are operating properly.

The invention has been described with particularity in connection with the preferred embodiments. However, it should be appreciated that changes may be made to the disclosed embodiments of the invention without departing from the spirit and inventive concepts contained herein.

What is claimed is:

1. An image quality control apparatus for controlling quality of xerographic images formed by a xerographic imaging system onto a recording medium when at least one sensor operative to provide input signals to the xerographic imaging system for quality control malfunctions, the image quality control apparatus comprising:

a controller in communication with the xerographic imaging system and including:
data collection means for collecting and processing sensor data received from the at least one sensor while the at least one sensor is operative;

determining means for determining whether the at least one sensor malfunction; and input generating means for
generating a controller input signal by using the sensor data collected by the data collection means, and
providing the controller input signal to the xerographic imaging system to control quality of the xerographic images when the determining means determines that the at least one sensor has malfunctioned.

2. An image quality control apparatus according to claim 1, wherein the controller:

an electrostatic parameters identifier device operative to identify electrostatic parameters of the xerographic imaging system;

a combination electrostatic/developmental parameters device operative to identify a combination of the electrostatic parameters and developmental parameters;

a developmental parameters device in communication with:
the electrostatic parameters identifier device and
the combination electrostatic/developmental parameters device
and operative to extract developmental parameters from;
the electrostatic parameters and
the combination electrostatic/developmental parameters; and an estimator device operative to estimate the controller input signal provided to the xerographic imaging system when the at least one sensor has malfunctioned.

3. An image quality control apparatus according to claim 2, wherein the determining means includes a switch electrically connected to and between the estimator device and the xerographic imaging system and operative to move to and between:

an opened state wherein the controller input signal is unable to transmit to the xerographic imaging system and a closed state wherein the controller input signal is transmitted to the xerographic imaging system.

4. An image quality control apparatus according to claim 3, wherein the switch moves from the opened state to the closed state when the determining means determines that the at least one sensor has malfunctioned.

5. An image quality control apparatus according to claim 4, wherein the switch automatically moves from the opened state to the closed state when the determining means determines that the at least one sensor has malfunctioned.

6. An image quality control apparatus according to claim 2, wherein:

the electrostatic parameters identifier device estimates the electrostatic parameters when the electrostatic parameters identifier device identifies the electrostatic parameters of the xerographic imaging system;

the combination electrostatic/developmental parameters device estimates the combination electrostatic/developmental parameters when the combination electrostatic/developmental parameters device identifies the combination of the electrostatic parameters and developmental parameters; and the developmental parameters device estimates the developmental parameters when the developmental parameters device extracts the developmental parameters from the electrostatic parameters and the combination electrostatic/developmental parameters.

7. An image quality control apparatus according to claim 1, wherein the at least one sensor is an electrostatic voltmeter device.

8. A method for controlling quality of a xerographic print produced by a xerographic imaging system after malfunction of at least one quality control sensor operably connected to the imaging xerographic system, the method comprising the steps of:

collecting sensor data from the at least one sensor while the at least one sensor is operating;

determining whether the at least one sensor malfunctions; and upon determining that the at least one sensor malfunctioned, generating a controller input signal based upon the collected sensor data and providing the controller input signal to the xerographic imaging system to control quality of the xerographic print.

9. A method according to claim 8, wherein the generating step includes the step of estimating the controller input signal.

10. A method according to claim 8, wherein the collected data includes electrostatic parameters and a combination of electrostatic and developmental parameters.

11. A method according to claim 8, wherein the controller input signal is an estimated controller input signal.

12. A method for controlling quality of a xerographic print produced by a xerographic imaging system having a plurality of quality control sensors operably connected to the imaging xerographic system, the method comprising the steps of:

collecting sensor data from the plurality of sensors while the plurality of sensors are operating;

determining whether at least one sensor malfunctions; and upon determining that at least one sensor malfunctioned, generating a controller input signal based upon the collected sensor data and data produced by remaining operating ones of the sensors and providing the controller input signal to the xerographic imaging system to control quality of the xerographic print.

* * * * *